May 16, 1939.   H. J. HORN ET AL   2,158,125
VEHICLE WHEEL
Filed July 25, 1935

INVENTOR.
HARRY J. HORN
and
CHARLES R. STOUGH
BY
Carroll R. Taber
ATTORNEY.

Patented May 16, 1939

2,158,125

UNITED STATES PATENT OFFICE 2,158,125

VEHICLE WHEEL

Harry J. Horn and Charles R. Stough, Lansing, Mich., assignors to Motor Wheel Corporation, Lansing, Mich., a corporation of Michigan Application July 25, 1935, Serial No. 33,087

4 Claims. (Cl. 301—37)

This invention relates to vehicle wheels and the combination therewith of ornamental covers therefor. More specifically, the invention relates to novel means for attaching an ornamental cover to a vehicle wheel.

Two embodiments of the invention are illustrated in the accompanying drawing, wherein.

Figure 1:
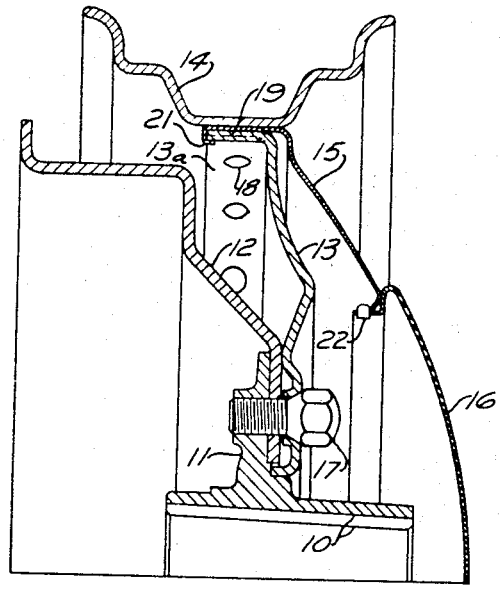
Figure 1 is a partial sectional view of a wheel having a cover attached thereto.

The wheel shown in Figure 1 includes a hub 10 having a hub flange 11, brake drum 12, a wheel body 13, a drop center rim 14, a cover 15 and a hub cap 16. The brake drum 12 and wheel body 13 are attached to the flange 11 of hub by the cap screws 17. The rim 14 is attached to the peripheral flange 13a of wheel body 13 by rivets 18.

Figure 2:
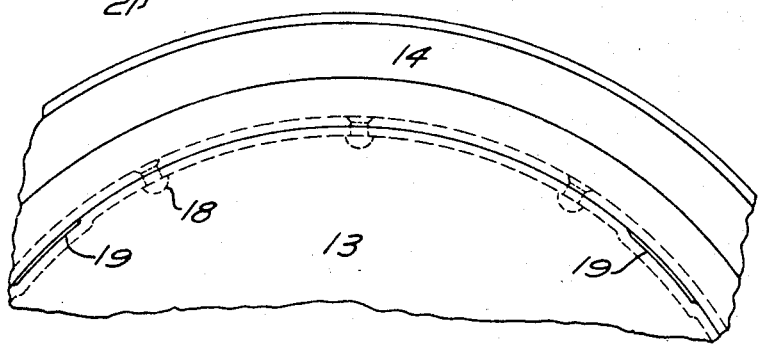
Figure 2 is a partial front view of the wheel shown in Figure 1 with the cover removed.

The flanged portion 13a of wheel body 13 constitutes a seat for the base of rim 14. In the preferred embodiment this flange is provided with axially extending depressed portions 19 at circumferentially spaced intervals (see Figure 2). The flange 13a is preferably provided with four of these depressions 19, equally spaced about its circumference. Thus when rim 14 is mounted on the flange 13a, the depressions provide axially extending openings between the rim and its seat. These openings are adapted to receive integral attaching projections carried by the cover 15.

Figure 3:
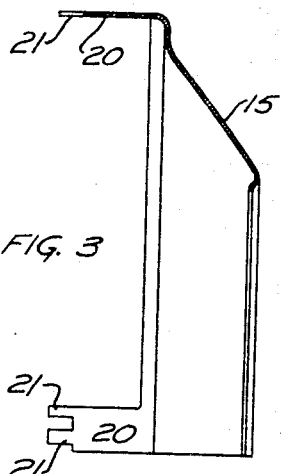
Figure 3 is a partial sectional view of the cover shown in Figure 1.
Figure 4:
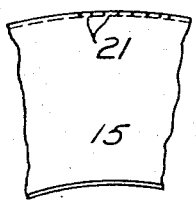
Figure 4 is a partial front view of the cover shown in Figure 3.

As best shown in Figures 3 and 4 the cover 15 is provided at its periphery with four equally spaced axially extending integral attaching projections 20. The free extremities of projections 20 are formed with fingers 21 which may be bent over to secure the cover to the wheel as will now be described.

Cover 15 is attached to the wheel by inserting projections 20 into openings 19. The fingers 21 extend beyond the inner ends of openings 19. To lock the cover in position on the wheel these fingers are bent over the edge of rim seat 13a as clearly shown in Figure 1. In this manner the cover 15 is rigidly connected to the wheel.

At its center the cover is provided with a large opening through which access may be had to cap screws 17 for mounting and demounting the wheel and cover as a unit. Hub cap 16 is detachably connected to cover 15 whereby to close this opening by the conventional spring attaching elements 22.

Figure 5:
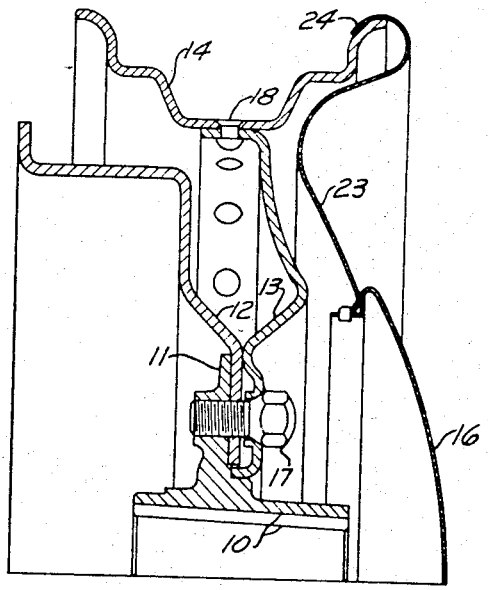
Figure 5 is a partial sectional view of a wheel having a cover attached thereto by a modified form of attachment.
Figure 6:
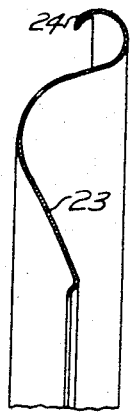
Figure 6 is a partial sectional view of the cover shown in Figure 5.
Figure 7:
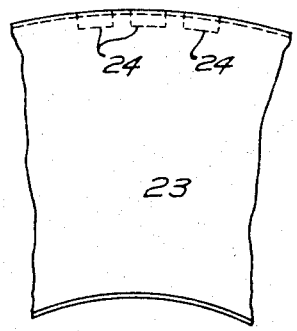
Figure 7 is a partial front view of the cover shown in Figure 6.

The construction just described is the preferred embodiment of the invention. A modified form is illustrated in Figures 5, 6 and 7.

In the modified embodiment the wheel proper is identical to that shown in Figure 1 except for the omission of the depressions 19. However, the cover 23 of Figures 5, 6 and 7 differs substantially from that of Figures 1 to 4. Cover 23 is adapted to be attached to one edge of rim 14. For that purpose a plurality of integral projections 24 are formed at the periphery of cover 23. The contour of cover 23 is such that projections 24 may be bent over the edge of rim 14 as shown in Figure 5. The cover is formed with a sufficient number of these projections, preferably arranged in spaced groups, to rigidly connect the cover to the wheel. As in the case of cover 15, cover 23 is provided with a large central opening adapted to receive a hub cap 16.

Perhaps the most important advantage of the present invention is that it provides means for attaching an ornamental cover to a wheel after the wheel has been fabricated without requiring the disassembly of the wheel. By this means the cover may be said to be semi-permanently attached to the wheel. That is to say, the cover is rigidly connected to the wheel but may be removed without disassembling the wheel merely by bending the attaching flanges back to their original position and then pressing the cover axially away from the wheel. This permits the replacement of a cover in case it is damaged without necessitating the replacement of the entire wheel.

The present invention as defined in the appended claims is not limited to the illustrative embodiments shown and described but may be incorporated in other modifications which will readily suggest themselves to those skilled in the wheel art.

We claim:

1. A vehicle wheel including, in combination, a wheel body having a plurality of spaced rim seat portions at its periphery, a rim mounted upon said seat portions, the wheel body being deformed intermediate said seat portions to form elongated narrow openings between said wheel body and said rim, and a cover plate having a plurality of substantially flat, axially extending integral projections extending from the periphery thereof into said openings to secure the cover plate to the wheel.

2. A vehicle wheel including, in combination, a wheel body having an axially extending annular flange at its periphery, a rim mounted upon said flange, said flange being deformed at spaced points to provide elongated narrow openings between the wheel body and rim, and a cover plate having a plurality of substantially flat, integral projections extending axially from the periphery thereof through said openings, said projections being deformed to secure the cover plate to the wheel.

3. A vehicle wheel including, in combination, a wheel body having an axially extending annular flange at its periphery, a rim mounted upon said flange, said flange being deformed at spaced intervals to provide openings between the wheel body and the rim, the circumferential extent of said openings being substantially greater than the radial extent thereof, and a cover plate having a plurality of spaced axially extending projections at its periphery, the periphery of the cover having a diameter substantially equal to the diameter at the periphery of the wheel body, the integral projections at the periphery of the cover extending through the openings between the rim and the wheel body and having their free ends deformed to secure the cover to the wheel.

4. A vehicle wheel including, in combination, a wheel body having a plurality of spaced rim seat portions at its periphery, a rim mounted upon said seat portions, the wheel body being deformed intermediate said seat portions to form elongated narrow openings between said wheel body and said rim, and a cover plate having a plurality of substantially flat projections integral with and extending axially from the cover plate into said openings to secure the cover plate to the wheel.

HARRY J. HORN.
CHARLES R. STOUGH.